United States Patent [19]
Beckmeyer et al.

[11] Patent Number: 5,330,945
[45] Date of Patent: Jul. 19, 1994

[54] CATALYST FOR TREATMENT OF DIESEL EXHAUST PARTICULATE

[75] Inventors: Richard F. Beckmeyer, Clarkston, Mich.; Chih-Hao Tsang, Houston, Tex.

[73] Assignee: General Motors Corporation, Detroit, Mich.

[21] Appl. No.: 970,707

[22] Filed: Nov. 3, 1992

Related U.S. Application Data

[63] Continuation-in-part of Ser. No. 681,251, Apr. 8, 1991, abandoned.

[51] Int. Cl.$^5$ .......................... B01J 21/16; B01J 29/06
[52] U.S. Cl. ............................................. 502/66; 502/64
[58] Field of Search .................................. 502/64, 66

[56] References Cited

U.S. PATENT DOCUMENTS

| | | | |
|---|---|---|---|
| 3,130,007 | 4/1964 | Breck et al. | 23/113 |
| 3,346,328 | 10/1967 | Sergeys et al. | 23/2 |
| 3,476,508 | 11/1969 | Kearby et al. | 502/79 |
| 3,518,202 | 6/1970 | Sowards et al. | 502/64 |
| 3,702,886 | 11/1972 | Argauer et al. | 502/77 |
| 3,925,195 | 12/1975 | Scherzer et al. | 208/120 |
| 4,289,606 | 9/1981 | Gladrow et al. | 208/120 |
| 4,297,328 | 10/1981 | Ritscher et al. | 423/213.2 |
| 4,748,012 | 5/1988 | Weber et al. | 502/64 |
| 4,934,142 | 6/1990 | Hayashi et al. | 60/297 |
| 4,950,461 | 8/1990 | Schwetje et al. | 423/239 |
| 5,157,007 | 10/1992 | Domesle et al. | 502/66 |
| 5,164,350 | 11/1992 | Abe et al. | 502/66 |
| 5,177,043 | 1/1993 | Horiuchi et al. | 502/66 |

FOREIGN PATENT DOCUMENTS

| | | |
|---|---|---|
| 0199169 | 10/1986 | European Pat. Off. . |
| 0485180 | 5/1992 | European Pat. Off. . |
| 0503500 | 9/1992 | European Pat. Off. . |

OTHER PUBLICATIONS

John R. Anderson and Michel Boudart, "Catalysis Science and Technology" (Springer-Verlag, 1981) pp. 232–261.

B. C. Gates et al, "Chemistry of Catalytic Processes", (published 1973), pp. 20–21.

*Primary Examiner*—Carl F. Dees
*Attorney, Agent, or Firm*—George A. Grove

[57] ABSTRACT

A preferred catalytically active solid acid material, zeolite, forms the basis of a washcoat effective for treating diesel-fueled engine exhaust to reduce emission of particulate. In a preferred method, hydrocarbon in exhaust is cracked and oxidized in the presence of a zeolite/silica washcoat mixture catalyzed with precious metal. A preferred Y-type zeolite provides acidic (cationic) sites having releasable cations which are exchanged with precious metal to form catalyzed zeolite. A preferred method of making the catalyzed zeolite/silica washcoat is provided, whereby colloidal silica is disposed as a barrier over the catalyzed washcoat, limiting exposure of catalyst to sulfur constituents in the exhaust.

12 Claims, 4 Drawing Sheets

CATALYST FOR TREATMENT OF DIESEL EXHAUST PARTICULATE

RELATED APPLICATION

The subject application is a continuation-in-part of co-pending application Ser. No. 681,251, filed Apr. 8, 1991.

FIELD OF THE INVENTION

This invention relates to a washcoat composition and to a method of treating diesel engine exhaust using the composition. More particularly, it relates to the catalytic cracking and oxidation of the condensable hydrocarbon (soluble organic fraction) of diesel exhaust particulate so as to beneficially reduce the mass of the particulate.

BACKGROUND OF THE INVENTION

In diesel-fueled engines, it is necessary to treat particles typically on the order of 0.1 micron in diameter. Each of the particles contains a solid, carbonaceous core with a soluble organic coating or shell of condensable hydrocarbon. Much of the hydrocarbon condenses on the core as the exhaust leaves the engine and the temperature drops.

The condensable hydrocarbon typically consists of relatively high molecular weight (heavy) hydrocarbon molecules in the range of $C_5$ to $C_{45}$, with correspondingly high boiling points, and condensable at about room temperature. Depending on the fuel and engine conditions, the condensable hydrocarbon comprises 20% to 80% of the mass of the particulate.

Diesel particulate can be collected and removed from an exhaust gas stream by various types of on-board filters or traps. These devices soon become clogged and must be cleaned or replaced. In order to remove collected particulate, the traps are heated by special heaters to temperatures greater than the exhaust temperature. This approach to treating particulate is technically difficult and costly, and introduces a variety of other problems. Accordingly, there is a need for an improved, relatively inexpensive method for treating diesel exhaust particulate to reduce the amount of particulate.

SUMMARY OF THE INVENTION

In accordance with the invention, diesel-fueled engine exhaust is treated to reduce the mass of particulate in the exhaust. This is accomplished by cracking and oxidation of exhaust gas hydrocarbon in the presence of a catalyzed washcoat in a catalytic converter. The catalytic converter has gas contacting surfaces defined by longitudinal exhaust flow passages (cells) in a support such as an extruded ceramic (cordierite) or corrugated metal monolith. The catalyzed washcoat layer is retained on the surfaces of the passages. As the exhaust gas passes through the cells of the monolith, it comes into contact with the washcoat which comprises a suitable solid acid material having hydrogen cations releasably retained at acidic sites. Such acidic material promotes the catalytic cracking of the condensable hydrocarbon in the hot exhaust gas. The elimination of some of the condensed hydrocarbon significantly reduces the total mass of the diesel exhaust particulate.

Desirably, the solid acid material is selected from the group of amorphous aluminosilicates (clay), crystalline aluminosilicates (zeolites) and mixed oxides containing silica. Preferably, the solid acid material is a zeolite with hydrogen cations releasably retained at exchangeable cationic sites. Zeolites having a $SiO_2/Al_2O_3$ molar ratio of $SiO_2$ to $Al_2O_3$ in the range of about 5 to about 150 are acceptable. Y-type and ZSM-type zeolites are preferred due to their good thermal stability. A suitable ZSM-5 type zeolite is described in U.S. Pat. No. 3,702,886 and a Y-type is described in U.S. Pat. No. 3,130,007. Such zeolites are in the form of micron size (fine) particles. The cationic sites of such zeolites are occupied either exclusively by hydrogen (H) cations or by multivalent cations that have been hydrolyzed so that H+ is present. The Y zeolite having a hydrogen (H) cation is referred to as an HY zeolite. Multivalent cations that can be so hydrolyzed are preferably selected from the group of lanthanum ($La^{+3}$), cerium ($Ce^{+3}$) and calcium ($Ca^{+2}$) and form LaY zeolites, CeY zeolites and CaY zeolites. The hydrolyzed form of these latter zeolites contains sufficient H cations to be suitably acidic. It has been found that best results are achieved with preferred Y-type zeolites (crystalline aluminosilicates) prepared by a method where the sodium cation (Na+) at cationic sites is replaced with hydrogen (H+). As stated, such zeolites are referred to as MY zeolites. Alternatively, ammonium exchanged zeolites are calcined at about 450° C. to obtain the hydrogen form.

In order to both crack and combust (oxidize) the condensable hydrocarbon, preferably the zeolite supports very fine particles of a catalytic metal selected from the group of platinum, palladium, ruthenium, rhodium and iridium. The very fine particles of such metal may occupy some of the cationic sites. Condensable hydrocarbon in the exhaust in contact with the cationic sites is cracked as the hydrogen cations are released from the sites, and the hydrocarbon is oxidized in the presence of the catalytic metal.

In order to improve adherence, the preferred HY-zeolite/metal catalyst is mixed with fine particles of an oxide, preferably silica. The particles of silica having a median particle size of about 10 to 20 microns are preferably of a similar size as the zeolite particles which have a median size of about 2 to 4 microns. The silica particles are larger than the particles of catalytic metal. The catalytic metal is generally in the form of clusters of atoms of nanometer size. Such silica particles are referred to as a powder to distinguish from very fine colloidal silica having a median particle size of about 0.2 microns. Some portion of the catalytic metal may be supported by the silica. Alternatively, all of the catalytic metal may be supported on the silica rather than on the zeolite. It should be noted that median particle size refers to that size at which 50% by weight of the particles are above and below in size, respectively.

The catalytic particles carried by the zeolite and silica are prone to undesired reaction with sulfur constituents in the exhaust. In order to prevent such undesired reaction, a layer of very fine colloidal silica (colloid) is disposed between the exhaust gas and the catalyzed zeolite/silica mixture. The particles of colloidal silica are larger than the catalytic metal particles, that is, less than one micron.

The function of the colloidal silica layer is to physically inhibit the diffusion of gaseous molecules to the active catalytic metal. However, the great affinity of the zeolite for hydrocarbons is strong enough to cause penetration through this barrier, permitting contact with the active metal. Additionally, the heavy hydrocarbons condensed on the washcoat as a liquid are absorbed through the protective layer by the sponge-like high surface area materials supporting the precious metals. This situation causes both the heavy and gaseous fraction of hydrocarbons to contact the catalytic metal while minimizing the sulfate formation, sulfur storage and sulfur poisoning which results from sulfur constituents coming in contact with the catalytic metals. Hydrocarbon is thus able to contact the zeolite where it is cracked, forming intermediate (smaller) hydrocarbons which may then be oxidized by the catalytic metal.

The method of the invention may be practiced using flow-through monoliths, beads or traps. The preferred zeolite/silica washcoat is preferably applied to and supported on a monolithic support body of ceramic or metal. Slurry containing the zeolite can be used alone or, to improve adherence, blended with the finely divided particles of an oxide, preferably silica, and applied as a washcoat onto either ceramic or metallic monolithic support bodies. A layer of colloidal silica is obtained by adding the colloid to the slurry or applying the colloidal layer over the applied washcoat. The slurry may also be used directly in making the walls of ceramic monoliths and then coated with the colloid. The metal catalyst particles are preferably fixed on the zeolite and/or the silica before the slurry is formed. If desired, the metal catalyst can be mixed into the slurry or can be loaded afterwards by a post-impregnation procedure. In either case, a colloidal layer is applied over at least a portion of the zeolite and/or silica particles carrying the catalytic particles.

Advantageously, the catalyzed washcoat of the invention may be utilized at the prevailing temperature of diesel exhaust, typically about 150° C. to about 750° C. The catalyzed washcoat combines the unique advantages of zeolite and silica. The hydrocarbon is attracted to the zeolite for effective cracking, and the silica is relatively resistant to sulfur and undesired reaction therewith.

Objects, features and advantages of this invention are to provide an improved method and catalysts for treating diesel engine exhaust particulate which reduce the amount of particulate by cracking, which minimize sulfur oxidation, which does not depend on relatively large amounts of a precious metal catalyst, and which is economical, efficient, effective and able to be used at the prevailing temperature of diesel exhaust.

These and other objects, features and advantages will become apparent from the following description of the preferred embodiments, appended claims and accompanying drawings.

DETAILED DESCRIPTION OF THE PREFERRED EMBODIMENTS

We have found that solid acid materials having releasable hydrogen cations at acid sites are surprisingly effective as catalysts for diesel fuel exhaust particulate emission control. Particulate is also referred to as "soot". The invention provides cracking of heavy (condensable) hydrocarbons into smaller, low boiling point, gaseous molecules to reduce the amount of heavy hydrocarbon condensable on and absorbed in the particles of soot.

Desirably, the solid acid material is selected from the group of amorphous aluminosilicates (clay), crystalline aluminosilicates (zeolites) and mixed oxides containing silica. Preferably, the solid acid material is a zeolite with hydrogen cations releasably retained at exchangeable cationic sites. Zeolites having a molar ratio of $SiO_2$ to $Al_2O_3$ in the range of about 5 to about 150 are acceptable. Preferred silica to alumina ratios are in this range because the relatively high silica content zeolites have better hydrothermal stability and less interaction with sulfates. However, zeolites with silica content near the lower end of the range have more ion exchange capacity (sites). Thus, a zeolite within the stated range will produce suitable results. The final selection will depend upon the apparently competing priorities of less reaction with sulfur and higher metal loadings (at exchange sites). Y-type and ZSM-type zeolites are preferred due to their good thermal stability. A suitable ZSM-5 type zeolite is described in U.S. Pat. No. 3,702,886 and a Y-type is described in U.S. Pat. No. 3,130,007. Such zeolites are in the form of micron size (fine) particles. The cationic sites of such zeolites are occupied either exclusively by hydrogen (H) cations or by multivalent cations that have been hydrolyzed so that H+ is present. The Y zeolite having a hydrogen (H) cation is referred to as an HY zeolite. Multivalent cations that can be so hydrolyzed are preferably selected from the group of lanthanum ($La^{+3}$), cerium ($Ce^{+3}$) and calcium ($Ca^{+2}$) and form LaY zeolites, CeY zeolites and CaY zeolites. The hydrolyzed form of these latter zeolites contains sufficient H cations to be suitably acidic. It has been found that best results are achieved with preferred Y-type zeolites (crystalline aluminosilicates) prepared by a method where the sodium cation (Na+) at cationic sites is replaced with hydrogen (H+). In a typical method of formation of acidic sites on zeolites, the alkaline earth metal, Na+, of the zeolites is replaced when ammonia $NH_4$ is decomposed to $NH_3$ while a hydrogen proton is released to replace the Na+. As stated, such zeolites are referred to as HY zeolites.

The method of treating diesel-fueled engine exhaust particulate with an HY-type zeolite basically comprises contacting the hot exhaust, with its condensable hydrocarbon content, with an HY-type zeolite having hydrogen cations at exchangeable cationic sites, and cracking at least a portion of the condensable hydrocarbon in contact with the sites as the hydrogen cations are released from the sites. Thus, the method provides a reduction in the amount of condensable heavy hydrocarbon and produces lighter gaseous hydrocarbons that can be more readily oxidized by catalytic metal. Although the method is surprisingly effective for cracking condensable hydrocarbon (liquid at room temperature), reaction of gaseous hydrocarbon (gaseous at room temperature), also present in the exhaust stream, may also occur.

In a preferred method, the condensable hydrocarbon is both cracked and combusted (oxidized) in the presence of zeolite supporting very fine particles of a catalytic metal selected from the group of platinum, palladium, ruthenium, rhodium and iridium. The very fine particles of such metal are carried by the zeolite in pores and on the surface of the zeolite, and preferably occupy some of the cationic sites. In this preferred arrangement, the condensable hydrocarbon in the exhaust is cracked as the hydrogen cations are released from the sites and the hydrocarbon is immediately oxidized in the presence of the catalytic metal at adjacent sites.

In another embodiment, the preferred HY-zeolite is mixed with fine particles of an oxide washcoat precursor, preferably silica. One or both of the silica and zeolite may be catalyzed with metal particles to form a catalyzed zeolite and silica washcoat mixture. The particles of silica are larger than the particles of catalytic metal, and some portion of the catalytic particles may be carried by the silica. The silica improves adherence of the catalyzed washcoat to a support substrate (monolith). In addition, the hydrocarbon is attracted to the zeolite for effective cracking, and the silica is relatively resistant to sulfur and undesired reaction therewith. Thus, the mixture provides unique advantages.

Despite the inclusion of silica in the washcoat, the catalyzed zeolite/silica washcoat mixture is prone to undesired reaction with sulfur constituents in the exhaust. In order to reduce such undesired reaction, a layer of very fine colloidal silica particles is disposed between the exhaust gas and the fine particles of silica and/or zeolite carrying the catalytic metal.

As stated earlier, the function of the colloidal silica layer is to essentially prevent contact between sulfur constituents and the active catalytic metal. However, the great affinity of the zeolite for hydrocarbons is strong enough to cause penetration through this barrier, permitting contact with the active metal. Hydrocarbon is thus able to contact the catalyzed washcoat and is cracked and/or oxidized.

Figure 1:
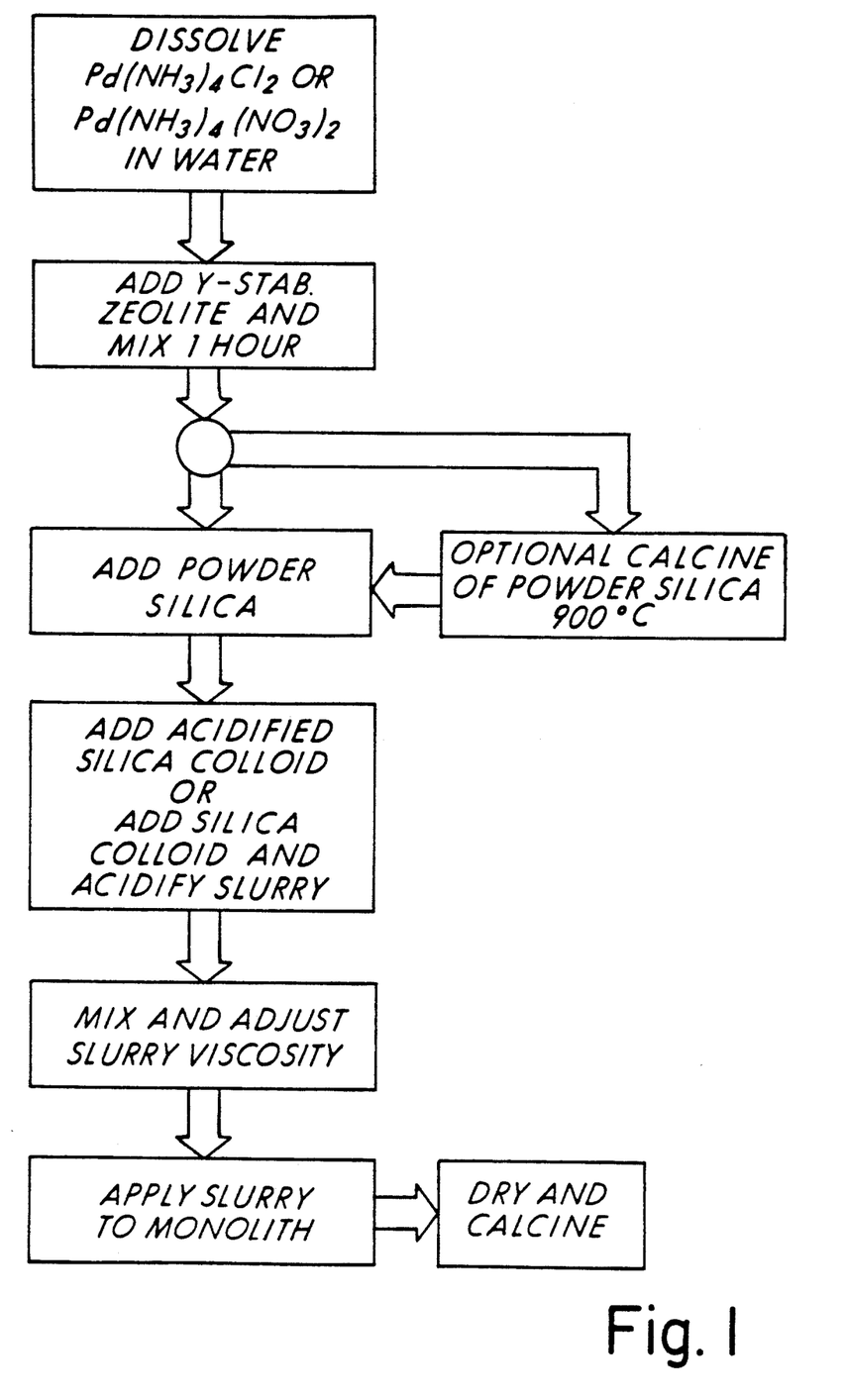
FIG. 1 is a flow diagram showing a preferred process of preparing the catalyzed washcoat of the invention.

One method of making the catalyzed washcoat of the invention is as shown in FIG. 1. We prefer to catalyze the zeolite particles by dissolving a precious metal amine salt in solution and then adding the zeolite. The amine salt is preferably $Pd(NH_3)_4Cl_2$ or $Pd(NH_3)_4(NO_3)_2$, which forms positively charged metal amine complexes. The metal complexes replace (ion-exchange) cations at the cationic sites of the zeolite. The catalytic metal is typically disposed in deep pores of the zeolite. The catalyzed zeolite may then be calcined to fix the metal in place. The catalytic metal is generally in the form of clusters of metal atoms of nanometer size.

Fine particles of silica are added to the wet solution containing the catalyzed zeolite. If desired, the silica may be calcined before it is added. If calcined after, some of the catalytic metal may migrate from the zeolite onto the silica. Thus, a portion of the precious metal is carried by fine particles of both of the zeolite and the silica.

Next, very fine colloidal silica is added to an aqueous solution at an acidic pH and mixed with the previously prepared zeolite/silica solution to obtain a pH of 2.5 to 3.5. At this pH, the zeolite powder carries a relatively positive surface charge, the silica powder carries a relatively neutral charge, and the colloid is negatively charged. Thus, at the acidic pH, the colloidal particles become attracted to the zeolite and the silica and become adhered. This mixture is preferably aged overnight and then applied to a substrate monolith using a vacuum to provide a thin layer of washcoat on the surface of internal passages of the monolith. The washcoated metal monolith is then dried in air, while being rotated or tumbled to prevent plugging of the passages. The dried metal and ceramic monoliths are then calcined in air at about 600° C.

Figure 2:
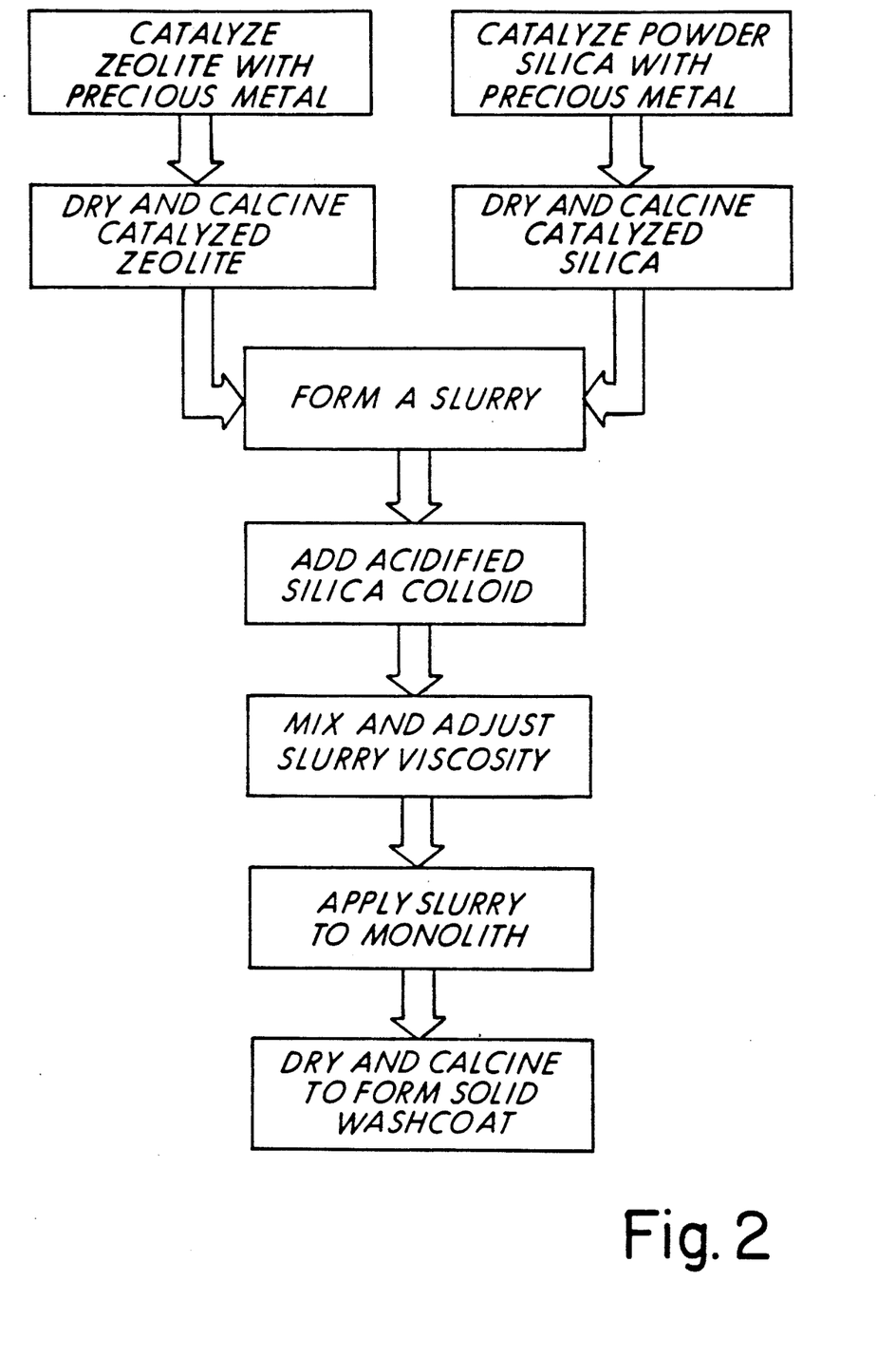
FIGS. 2 and 3 are flow diagrams showing alternative processes of preparing the catalyzed washcoat of the invention.

It was observed that the precious metal carried by the zeolite was more dispersed than the precious metal carried on the powder silica. This was thought to enhance the catalytic effect of the washcoat as compared to applying precious metal to only one of powder silica and zeolite. Accordingly, washcoats were prepared by separately catalyzing powder silica and zeolite (FIG. 2). The catalyzed powder silica and zeolite were each calcined to fix the precious metal in place. An aqueous, acidic slurry of the catalyzed zeolite, the catalyzed silica powder and the colloidal silica was prepared and then coated onto a monolith.

Figure 3:
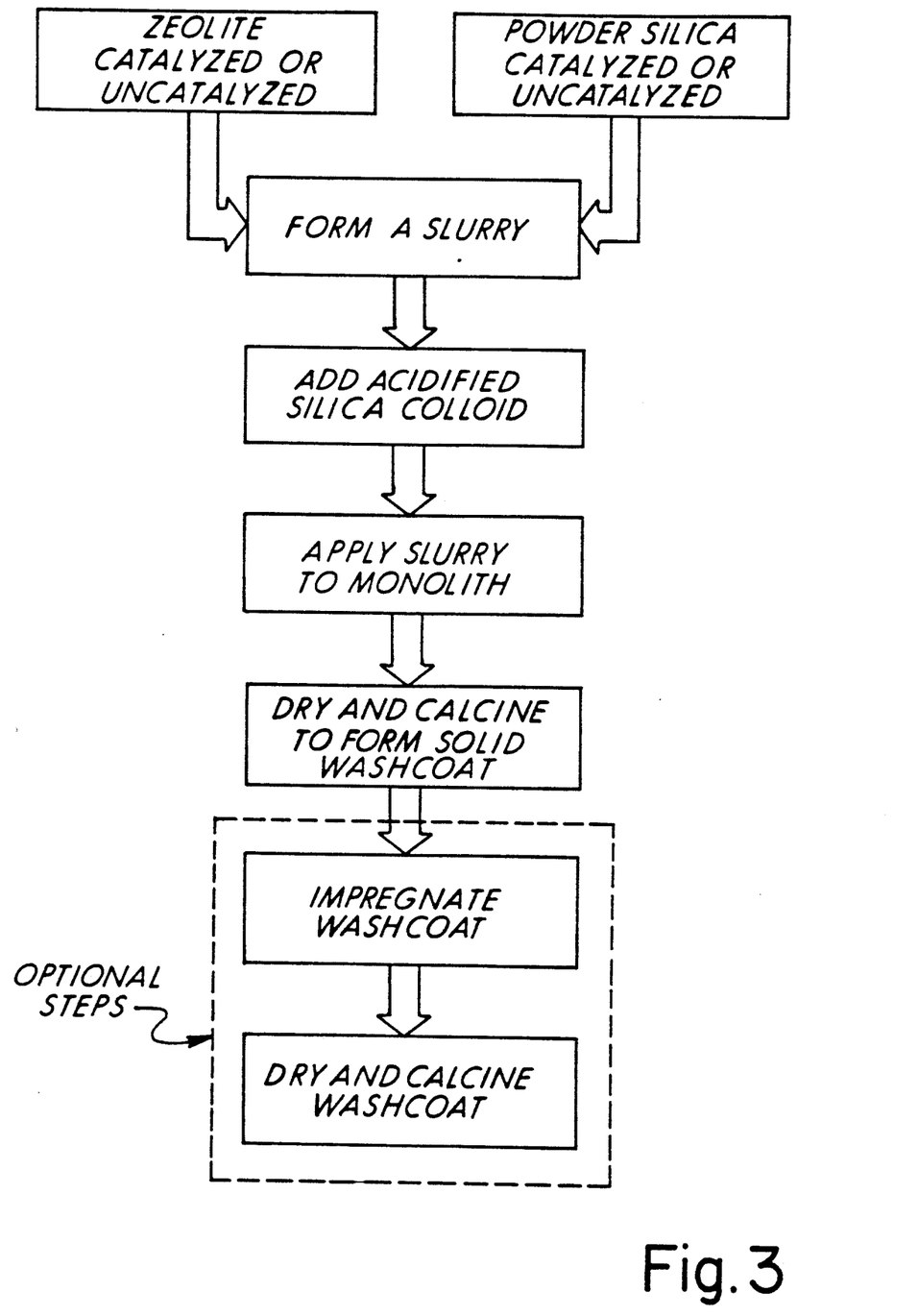

A precious metal salt, which is dissolvable in water, may be used to deposit precious metal on the surfaces of and in the pores of the powder silica and zeolite. Salts which form amine or chloride metal complexes are suitable. Examples include $Pd(NH_3)_4Cl_2$, $Pd(NH_3)_4(NO_3)_2$ and $H_2PdCl_4$. The precious metal of an amine precursor is preferred to exchange catalytic metal with the positive ion at exchange sites of the zeolite. A monolith was post-impregnated with an aqueous solution of a positively charged metal complex at an acidic pH, whereby palladium amine was ion exchanged into the zeolite (FIG. 3). The lower the pH, the greater the attraction of metal to the zeolite. The ionic metal complex penetrated through the colloidal silica and deposited the precious metal on the zeolite, due to the attraction between the ions and the zeolite. Surprisingly, only a small amount of metal was attracted to colloidal silica. Thus, catalytic metal was preferentially deposited on the zeolite and below the colloidal silica barrier. Post-impregnation with a negatively charged metal complex was also possible, although preferential attraction to zeolite was lessened as compared to a positive complex.

As can be seen, the unique properties of the composition, containing zeolite, silica powder and colloid, provide production flexibility. Good results are achieved using a variety of catalyzing slurry formations and calcining steps, all of which lead to a zeolite/silica washcoat having at least a portion of the precious metal disposed below a colloidal silica barrier.

The washcoat of the invention was tested with and without precious metal. In a first test, the hydrocarbon cracking ability of preferred zeolite was tested against conventional catalyzed single oxides. In additional tests, washcoats comprising zeolite, silica powder and precious metal with at least a partial colloidal barrier were used to treat diesel exhaust and compared to conventional catalyzed single oxide washcoats.

EXAMPLE 1

A sample of 35 mg commercial hydrogen form Y-type zeolite (HY zeolite), which was precious metal-free, was compared with 3.5 mg $Pd/SiO_2$ (palladium and silica) catalysts (3.3 weight percent Pd loading) to determine the gasification efficiency of each of them for n-dodecane (a heavy hydrocarbon: $nC_{12}$). The HY zeolite was obtained from PQ Corporation of Valley Forge, Pennsylvania. The efficiency tests were performed with Y-type zeolites in an ammonium form as received from the vendor and calcined at 450° C. to obtain the hydrogen form. Comparative precious metal loaded catalysts ($Pd/SiO_2$ and $Pd/Al_2O_3$) were calcined. Gasification efficiency was determined based on the weight of condensable hydrocarbon in a trap at the outlet of a reactor during runs with catalyst present (w) and without catalyst present (WO). [The formula used was: Efficiency=(WO−W)/WO.] The n-dodecane is, based on volatility, representative of the condensable hydrocarbon or the soluble organic fraction of diesel fuel exhaust particulate emissions. In the test, a stream of air, approximately 88 ml/min, was bubbled through a reservoir of n-dodecane at about 57° C. The liquid hydrocarbon molecules entrained by the air were allowed to flow through the catalyst bed at 250° C. and then cracked and/or oxidized.

The fraction of the product stream which contained hydrocarbons having boiling points higher than room temperature was collected in a trap and quantified gravimetrically. The n-dodecane gasification efficiency of each catalyst was obtained by comparing the amount of hydrocarbon condensed in the trap during the one-hour runs with the catalyst and with a blank reactor.

TABLE 1

| Catalyst Composition | Weight (mg) | Gasification efficiency %** |
|---|---|---|
| Zeolite (HY) | 35 | 26 |
| Pd/SiO$_2$ | 3.5* | 28 |
| Pd/Al$_2$O$_3$ | 3.5* | 30 |
| Al$_2$O$_3$ | 35 | 5 |
| SiO$_2$ | 35 | less than 5 |

*3.3 weight percent Pd loading; calcined.
**Results were obtained without aging of the catalyst.

The results of the gasification efficiency test are shown in Table 1. The gasification efficiency of zeolite (HY) was 26% and about comparable to the efficiency of silica loaded with palladium (Pd) and alumina loaded with Pd. Silica and alumina individually showed efficiencies of 5% or less.

The results, as shown in Table 1, indicate that under the conditions used, the catalytically active acid sites on the HY zeolite reduced the amount of liquid or condensable hydrocarbon as efficiently as the silica-supported or alumina-supported catalysts heavily loaded with Pd. Even though 10 times as much MY zeolite was used, the cost of this catalyst was much lower because of the absence of the precious metals.

EXAMPLE 2

A solution containing a palladium amine salt was prepared by adding about 40 grams of Pd(NH$_3$)$_4$Cl$_2$ to about 0.85 liters of water. About 250 grams of a Y-type stabilizer ammonium form zeolite designated as CBV-500, supplied by PQ Corporation, was added to the solution. Next, fine particles of silica (powder) were added. The silica powder was obtained from Rhone Poulenc and had a BET surface area in the range of 400 to 600 square meters per gram (m$^2$/gram), as received, and a median particle size of about 12 microns. This powder was obtained under the designation GM-540 from Rhone Poulenc.

Next, very fine particles of colloidal silica were added to an aqueous solution containing 69 grams of reagent grade nitric acid. The colloidal silica, as received from the vendor Elkem, had a BET surface area in the range of 25 to 30 m$^2$/gram. This silica is sold under the designation EMS 9705 and has a median particle size of about 0.2 microns. Other properties of colloidal silica include a chemical composition of about 94% to 99% amorphous silicon dioxide and about 2% or less of impurities such as carbon, alkali and alkaline earth metals, iron and alumina. This chemical composition is similar to that of the Rhone Poulenc powder.

The acidic solution containing the colloidal silica was added to the previously prepared zeolite/silica mixture and aged overnight. After aging, the pH increased from 2.5 to 3.2. Metal monoliths having 309 in$^3$ overall volume and 200 cells (passages) per square inch were coated using 660 grams of the washcoat and 50 grams of palladium for each cubic foot of monolith. This corresponds to 1.3% by weight precious metal in the washcoat, after drying and calcining. The proportion of oxides used in this formulation, on the basis of 100 parts of oxide, is as follows: about 20% zeolite, about 40% silica powder and about 40% colloidal silica on a dry basis. The dry basis refers to the colloid being in a oxide form rather than a hydrate form. Suggested ranges for these oxides are 10% to 60% zeolite, 20% to 70% powder silica and 20% to 70% colloidal silica (nonhydrate). A preferred composition is 20% zeolite, 40% powder silica and 40% colloidal silica.

EXAMPLE 3

The method of Example 2 was used except that the amount of the palladium amine precursor was increased to provide 100 grams of palladium for each cubic foot of monolith. This corresponded to 2.6% by weight precious metal in the washcoat after drying and calcining.

EXAMPLES 4 AND 5

The method of Example 2 was followed except that smaller 85 in$^3$ monoliths having 400 cells per square inch were coated. In this example, monoliths were prepared with either platinum or palladium. The precious metal salt in each case was an amine chloride in an amount sufficient to provide 25 grams of precious metal per each cubic foot of monolith. This corresponded to about 0.6 weight percent precious metal in the washcoat after drying and calcining.

TESTING AND COMPARISON OF COATED MONOLITHIC CONVERTERS

The monoliths of Examples 2 and 3 were exposed to exhaust from a 6.2 liter diesel truck engine for four hours. These monoliths were considered "fresh" and were next tested for particulate and hydrocarbon conversion efficiencies. After an additional 100 hours of exposure to high temperature exhaust ("aging"), the monoliths were again tested. The monoliths of Examples 2 and 3 were compared to a monolith having a conventional silica supported palladium catalyst.

Figure 4:
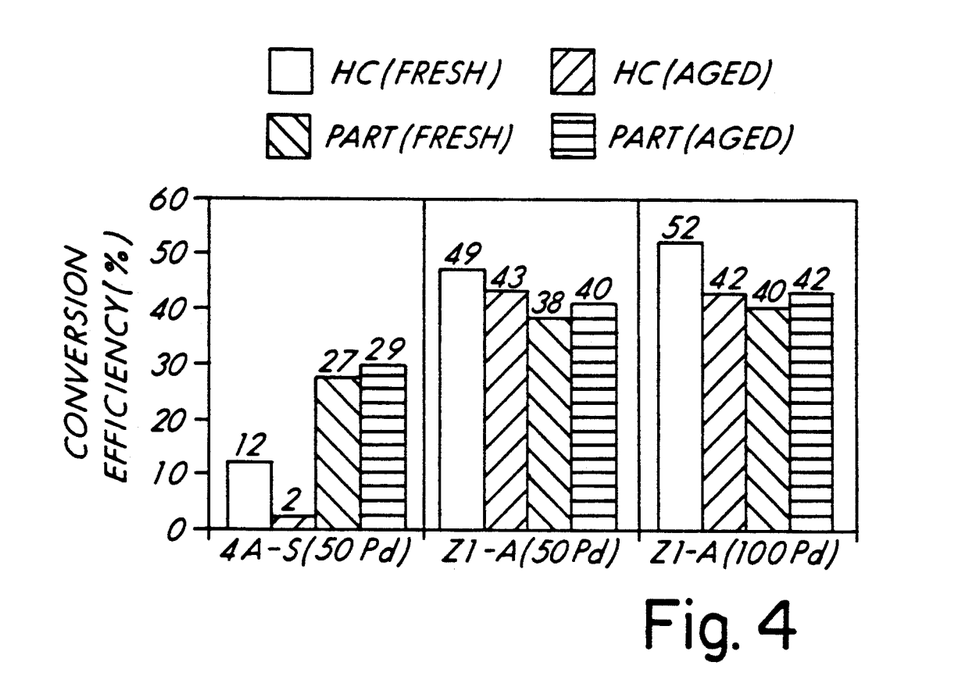
FIGS. 4 and 5 are graphs showing hydrocarbon and particulate reduction efficiencies for washcoats of the invention and comparative, conventional washcoats.

As shown in FIG. 4, the catalyst of Examples 2 and 3 (Z1A-50 Pd; Z1A-100 Pd) were more effective in reducing particulate and gaseous hydrocarbon, as compared to the conventional silica supported Pd (4AS-50 Pd). It also appeared that little advantage resulted from doubling the amount of catalyst from 50 to 100 grams/ft$^3$palladium.

The catalysts of Examples 4 and 5 were tested to determine hydrocarbon and particulate conversion efficiency. Before testing each of the metal monolith converters (Z1A-25 Pd and Z1A-25 Pt) were aged on a 6.2 L, V-8 diesel engine dynamometer for 24 hours according to a preset simulated driving schedule, which is an AMA Schedule. The catalyst converter aging facility consisted of the dynamometer controlled engine, a gas flow control system, emissions analysis and a computer interface. In the simulation, catalysts were aged while exposed to exhaust while engine operation was varied according to the schedule, under controlled conditions.

After aging, the catalysts were evaluated under transient test conditions using the U.S. Federal Test Procedure (FTP). The tests were started hot. The exhaust gas source was an Opel Vectra. The car was manually operated so as to provide a temperature in a range of 100° C. to 430° C. at the inlet to the monolith.

During the tests, the inlet temperature of the exhaust to each converter was controlled by an operator following a speed cycle with a load preset on rollers on which the wheels of the car turned. Samples were drawn from a straight pipe mounted on the car and the results compared to a converter mounted in place of the straight pipe. The particulate was collected on filters. The weights of the filters prior to and after the particulate collection were measured to calculate the weight of the particulate collected. The efficiency of particulate conversion was the difference in particulate weight collected at the outlet of a straight pipe and a converter. This difference is divided by the straight pipe particulate weight and multiplied by one hundred to obtain particulate efficiency. The gaseous hydrocarbon efficiency was determined by comparing hydrocarbon emissions from the straight pipe with hydrocarbon emissions from the converter in place of the straight pipe, as measured on a hydrocarbon gas analyzer.

Figure 5:
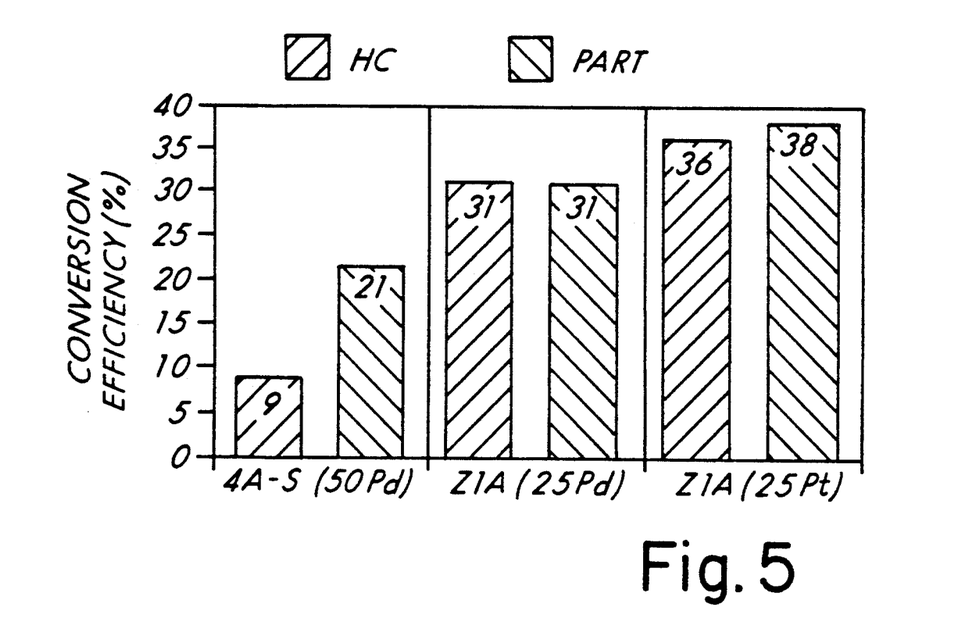

Transient testing (FIG. 5) showed that the washcoat formulation of Examples 4 and 5 were more effective than conventional silica supported palladium (4AS-50 Pd). This result is striking given that the comparative conventional silica (4AS-50 Pd) had twice as much catalytic metal as compared to the monoliths of Examples 4 and 5. Importantly, both palladium and platinum were effective in achieving good results when supported on the zeolite/silica washcoats of the invention.

Advantageously, zeolite was relatively inert toward sulfur uptake as evaluated by the thermal gravimetric analysis (TGA) testing to characterize the absorptive ability of different washcoat oxides toward $SO_2$ and $SO_3$. The results shown in Table 2 represent sulfur uptake as a percent weight gain. During the test, several washcoat formulations, uncatalyzed and catalyzed with Pt, were exposed for 12 hours to 22 ppm $SO_2$ and 7% $O_2$ in $N_2$ flowing at 75 ml/min at 450° C. As shown in Table 2, zeolite and zeolite/silica washcoats (Z1A) are relatively resistant to sulfur storage and release.

TABLE 2

| Results in % Weight Gain During Exposure to $SO_2$ | | |
| --- | --- | --- |
| Oxide | Pure | With Pt |
| DS-4A silica | 0.18 | 0.28 |
| SCFA 100 alumina | 0.98 | 1.45 |
| CBV 500 zeolite | 0.40 | 0.47 |
| Z1A | 0.22 | 0.28 |

Thus, the invention combines the unique advantages of zeolite which absorbs hydrocarbons while not absorbing $SO_2$, and of silica powder which is resistant to $SO_2$ and enhances adherence of colloidal silica which is able to form a layer over the larger particles of zeolite and silica. The washcoat of the invention is so effective, relatively low concentrations of precious metals are sufficient to achieve effective catalysis and selective oxidation of hydrocarbon.

Although zeolites (crystalline aluminosilicates) are preferred, the catalyzed washcoat may also be formed using other solid acid materials, namely, amorphous aluminosilicates and mixed oxides, having silica as the main constituent. Examples include silica in combination with one or more of alumina, titania, lanthana, zirconia and ceria. Such mixed oxides are formed by mechanical or chemical mixing (i.e., co-precipitation). However, we prefer to use the zeolite.

While this invention has been described in terms of certain embodiments thereof, it is not intended that it be limited to the above description, but rather only to the extent set forth in the following claims.

We claim:

1. A washcoat for treatment of exhaust emissions from diesel engines comprising intermingled fine particles of zeolite and silica, the zeolite having exchangeable cations at cationic sites, and very fine particles of catalytic metal, at least a portion of the catalytic metal occupying such sites; and very fine particles of colloidal silica disposed in a thin layer overlying the particles of zeolite, silica, and catalytic metal, the overlying colloidal silica layer serving as a barrier to sulfur constituents in the exhaust emissions thereby inhibiting reaction thereof with the catalytic metal while permitting penetration of hydrocarbon to be cracked and oxidized by the underlying particles.

2. A washcoat for treatment of exhaust emissions from diesel engines comprising intermingled fine particles of silica and zeolite, and very fine particles of catalytic metal, at least a portion of the catalytic metal carried by the zeolite particles; and very fine particles of colloidal silica disposed over the particles of zeolite, silica, and catalytic metal, the overlying colloidal silica layer serving as a barrier to sulfur constituents in the exhaust emissions thereby inhibiting reaction thereof with the catalytic metal while permitting penetration of hydrocarbon to be cracked and oxidized by the underlying particles.

3. A method of making a washcoat mixture for treatment of exhaust emission from diesel engines, comprising:
   a) impregnating fine particles of at least one of zeolite and silica with very fine particles of catalytic metal selected from the group consisting of platinum, palladium, rhodium, ruthenium and mixtures thereof;
   b) forming a slurry having the fine particles of zeolite and silica and very fine particles of colloidal silica at an acidic pH; and
   c) applying the slurry as a thin coating to a support substrate.

4. The method according to claim 3, wherein step (a) is conducted by impregnating only the zeolite particles with the catalytic metal and then calcining the zeolite particles.

5. The method according to claim 3, wherein step (a) is conducted by impregnating fine particles of both the zeolite and the silica with the catalytic metal and then calcining the impregnated zeolite and silica particles.

6. The method according to claim 3 and further including drying and calcining the slurry-coated substrate to form a substantially solid and adherent washcoat layer of the particles.

7. The method according to claim 3 and further including after step (c), drying and calcining the slurry-coated substrate to form a substantially solid and adherent washcoat layer of the particles, and then impregnating the solid washcoat layer with a solution containing an ionic complex of a metal selected from the group consisting of platinum, palladium, rhodium, ruthenium and mixtures thereof.

8. The method according to claim 7 and further including calcining the impregnated washcoat layer.

9. A method of making a washcoat mixture for treatment of exhaust emission from diesel engines, comprising:
   a) forming a slurry of fine particles of zeolite, fine particles of silica and very fine particles of colloidal silica at an acidic pH;
   b) applying the slurry as a thin coating to a support substrate;
   c) drying and calcining the slurry-coated substrate to form a substantially solid and adherent washcoat layer of the particles;
   d) impregnating the solid washcoat with an ionic complex of a metal selected from the group consisting of platinum, palladium, rhodium, ruthenium and mixtures thereof; and then
   e) drying and calcining the impregnated washcoat layer.

10. The method according to claim 9, wherein the ionic complex is a metal amine cation.

11. The washcoat according to claim 1 wherein the layer of colloidal silica particles is devoid of catalytic metal.

12. The washcoat according to claim 2 wherein the layer of colloidal silica particles is devoid of catalytic metal.

* * * * *